(12) United States Patent
Dupont

(10) Patent No.: US 6,311,106 B1
(45) Date of Patent: Oct. 30, 2001

(54) AUTOMATIC FLAT RATE SETTING SYSTEM FOR FREIGHT FEEDER AIRCRAFT AND METHOD OF SETTING OF ENGINE FLAT RATE

(75) Inventor: John J. Dupont, Lawrenceville, GA (US)

(73) Assignee: American Utilicraft Corporation, Lawrenceville, GA (US)

( * ) Notice: Subject to any disclaimer, the term of this patent is extended or adjusted under 35 U.S.C. 154(b) by 0 days.

(21) Appl. No.: 09/584,169

(22) Filed: May 26, 2000

(51) Int. Cl.[7] .............................. B63H 1/28; G01M 1/12
(52) U.S. Cl. .................. 701/3; 73/65; 177/136; 177/25; 416/44; 416/25; 416/47; 244/6
(58) Field of Search ................. 701/3, 124; 73/178 T, 73/865; 702/175, 173; 177/25; 416/44, 36, 43; 244/17.13

(56) References Cited

U.S. PATENT DOCUMENTS

| | | | |
|---|---|---|---|
| 2,425,498 | 8/1947 | Watter | 244/118.3 |
| 4,225,926 | * 9/1980 | Wendt | 701/124 |
| 5,106,038 | 4/1992 | Dupont | 244/137.1 |
| 6,007,198 | * 12/1999 | Karem | 416/44 |
| 6,128,951 | * 10/2000 | Nance | 73/178 T |

* cited by examiner

Primary Examiner—William A. Cuchlinski, Jr.
Assistant Examiner—Tuan C To
(74) Attorney, Agent, or Firm—Rothwell, Figg, Ernst & Manbeck

(57) ABSTRACT

A system and method of automatically setting a flat rate engine power setting of an aircraft determines the weight of loaded cargo containers to determine the total gross weight of the aircraft prior to take-off, determines, from the total gross weight, the required flat rate engine power for the aircraft, such as by inputting the stored value into a look-up table, and automatically sets the flat rate setting of the aircraft's engines to correspond to the determined required engine power, prior to take-off, by sending the obtained required flat rate engine power as a command signal to an engine control system.

13 Claims, 6 Drawing Sheets

AUTOMATIC FLAT RATE SETTING SYSTEM FOR FREIGHT FEEDER AIRCRAFT AND METHOD OF SETTING OF ENGINE FLAT RATE

BACKGROUND OF THE INVENTION

1. Field of the Invention

The present invention relates generally to aircraft, and more specifically to freight feeder aircraft for short-haul air transportation of containerized cargo from originating locations to a central point where the cargo may be efficiently reloaded onto large size aircraft for longhaul transportation to another central reloading point or to a final destination. The invention relates particularly to a method and system of automatically resetting the flat rate setting of the engines of such a freight feeder aircraft based on the actual operational gross weight of the aircraft prior to takeoff.

2. Background and Prior Art

Cargo carrying aircraft are known in the art. Typically, such aircraft are for long-haul operations, are of very large size, require long runways for takeoff and landing, and are inefficient and uneconomical for short-haul operations. Loading and unloading cargo from such aircraft is particularly inefficient and requires a significant amount of time, thus undesirably increasing the "turn around" time from landing and unloading to reloading for another takeoff.

An example of a known cargo carrying aircraft is shown in U.S. Pat. No. 2,425,498 to Watter.

Power lifted aircraft, in the form of helicopters, have also been known for many years and used for air transportation of cargo. While such aircraft have many advantages over conventional aircraft, which typically require runways of a minimum specified length for takeoff and landing, helicopters are incapable of fulfilling the rapidly developing needs of the commercial and military air cargo transportation systems as a result of the operational and economic limitations of such aircraft.

A new type of aircraft which fills the needs of the short haul freight industries, such as the overnight express package delivery industry, as well as the increasingly containerized freight transportation systems of the military services, has been proposed by the present inventor and is the subject of U.S. Pat. No. 5,106,038, incorporated herein in its entirety by reference.

There remains, however, a need in the art to reduce the cost of freight transportation by such freight feeder aircraft, and in particular to reduce fuel costs, to reduce wear and tear on the aircraft's engines, and consequently to reduce aircraft maintenance costs and to increase engine life.

SUMMARY OF THE INVENTION

The present invention provides, in one preferred embodiment thereof, a fixed-wing freight feeder aircraft and a method of transporting cargo which solves the above noted problems and fulfills the existing needs of the commercial and military freight transportation systems.

The present invention provides, in one preferred embodiment thereof, a method of automatically setting a flat rate engine power setting of an aircraft, including the steps of determining when a cargo container has been loaded onto the aircraft, determining the weight of the loaded cargo container and adding the determined weight to a weight storage register, determining the total gross weight of the aircraft prior to take-off by reading out a stored value from the weight storage register, determining, from the total gross weight, the required flat rate engine power for the aircraft by inputting the stored value into a look-up table, and automatically setting the flat rate setting of the aircraft's engines to correspond to the determined required engine power, prior to take-off, by sending the obtained required flat rate engine power as a command signal to an engine control system.

According to another aspect of the invention, a system is provided to carry out the automatic engine flat rate setting method set forth above.

DETAILED DESCRIPTION OF THE PREFERRED EMBODIMENTS

The aircraft according to one embodiment of the invention is a twin-engine, turbo-prop, high wing, fixed gear, unpressurized aircraft, having an elongated unobstructed constant contour cargo compartment in the fuselage thereof. The cargo compartment is configured to accommodate four or more industry standard LD-3 size containers, which are presently used by the major airlines to hold baggage, mail, and cargo for transportation within the bellies of large passenger aircraft.

Figure 1:
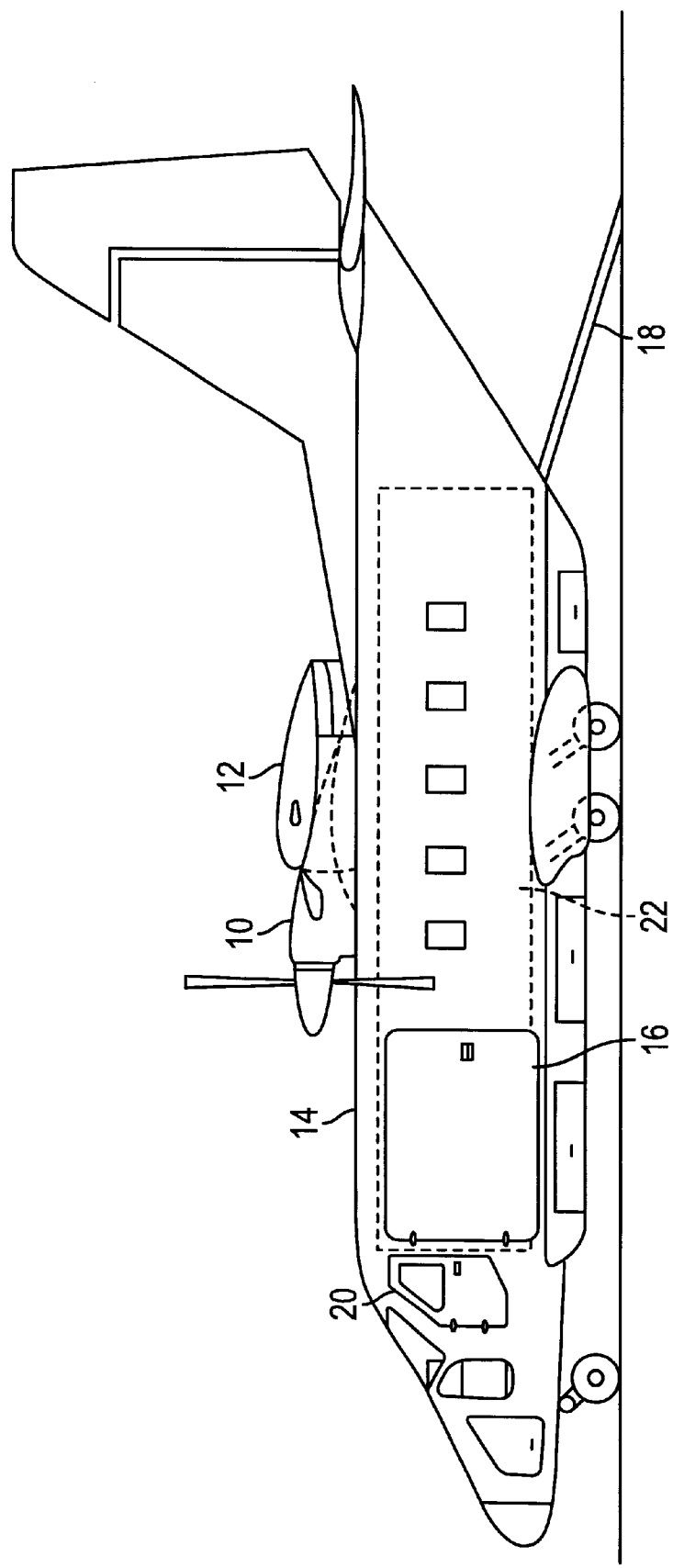
FIG. 1 is a side elevational view of a freight aircraft according to one preferred embodiment of the invention.
Figure 2:
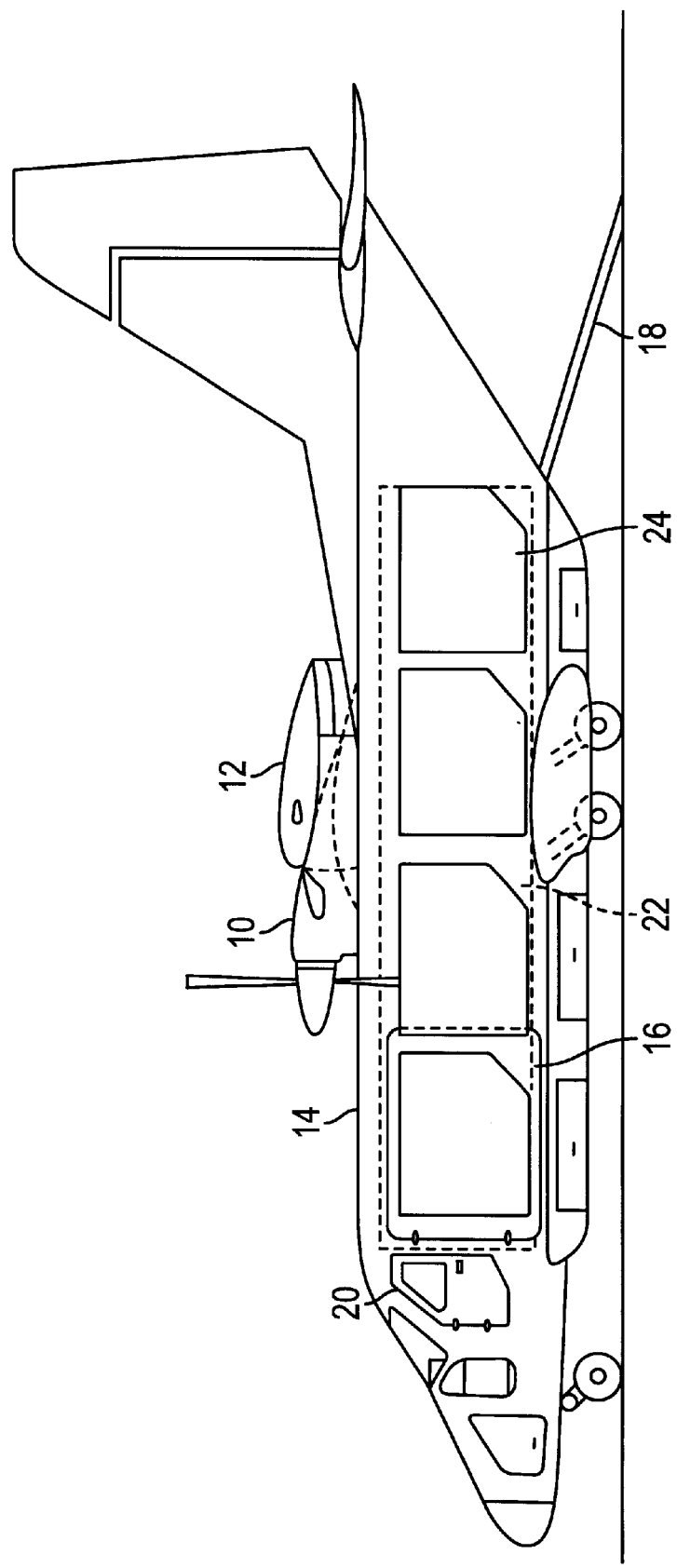
FIG. 2 is a ghost side elevational view of the aircraft of FIG. 1 showing the storage of a plurality of standardized cargo containers in the fuselage thereof.
Figure 3:
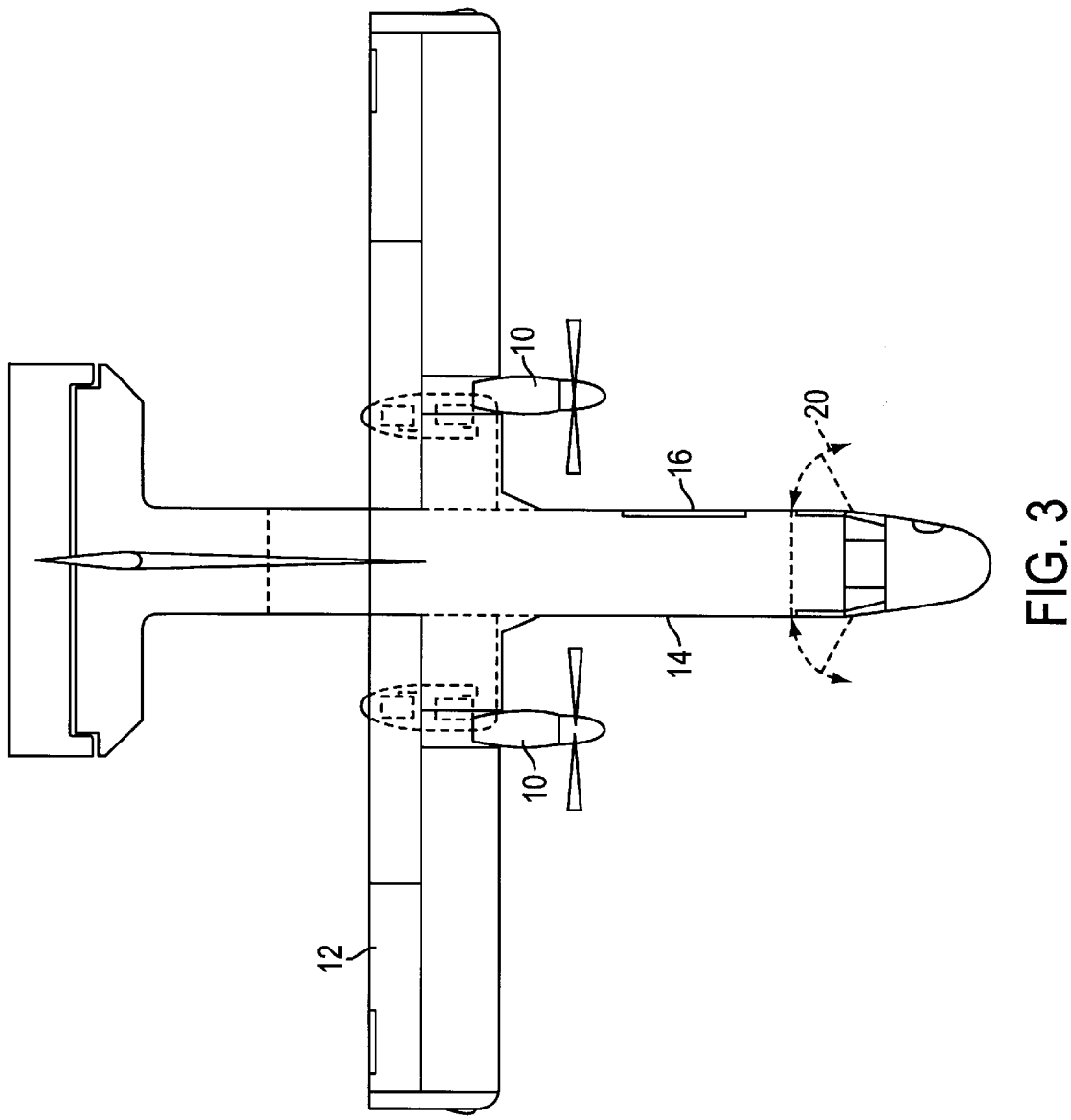
FIG. 3 is a top plan view of the aircraft of FIG. 1.

Referring to FIGS. 1–3, twin turboprop engines 10 are mounted on the high wing 12 of the aircraft, above the fuselage 14. The combination of the high wing and engine mounting configuration lends itself to power-lifted STOL (short take-off and landing) operation through the use of engine exhaust channeling over the wing surface to achieve laminar flow and thus increased lift.

The fuselage includes a pair of cockpit access doors 20 which open to the cockpit of the aircraft which can accommodate a crew of two.

Within the fuselage 14 is a cargo compartment 22 which extends fore and aft within the fuselage 14, and which is dimensioned to accommodate a plurality of standardized cargo containers 24, such as the industry standard LD-3 container. While the figure shows for purposes of illustration the accommodation of four LD-3 containers, it will be noted that the fuselage can be dimensioned to accommodate more than four containers, by suitably increasing the length thereof and proportionately increasing the other dimensions of the aircraft body. At the left side forward portion of the fuselage, a cargo access door opening 16 is provided, which is dimensioned to allow the standardized cargo containers 24 to pass therethrough and into the forward portion of the cargo compartment 22. The cargo access door opening 16 is closed by an access door when the aircraft is in flight.

The aft portion of the fuselage includes a load bearing on load/off load ramp 18 which opens to form a downwardly sloping ramp over which the containers 24 may be off-loaded to the ground. The load bearing ramp 18 may also be lowered and fixed or supported at intermediate positions above the ground level for direct loading into the rear of a cargo vehicle or to a fixed terminal cargo handling system.

Figure 4:
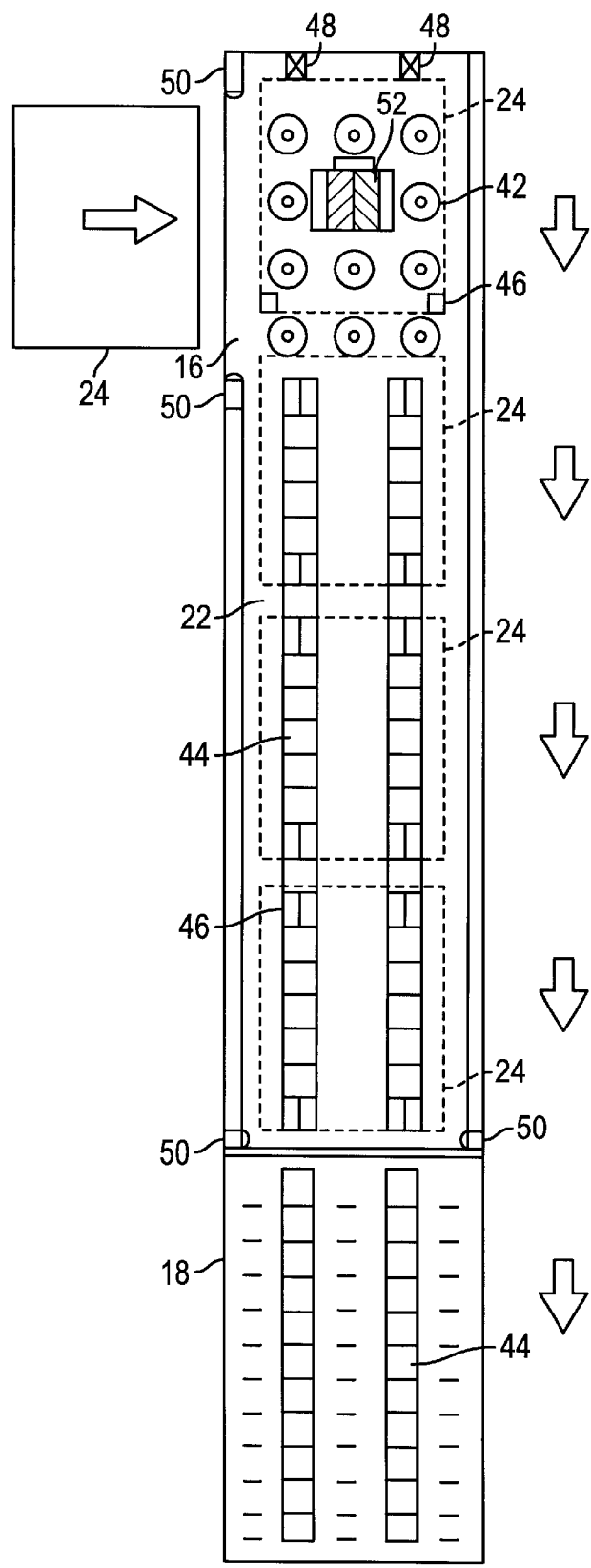
FIG. 4 is a cutaway top view of the interior of cargo compartment 22 of FIGS. 1 and 2.

The interior floor of cargo compartment 22 may include a cargo container handling and transport system for facilitating the movement of containers 24 from the fore section of the compartment 22 to the aft section thereof, as shown in FIG. 4. Specifically, a container 24 is loaded into the cargo compartment 22 and onto a plurality of omnidirectional ball bearings 42 which are permanently set into the cargo floor. The plurality of ball bearings form a ball mat which provides for rolling movement of the cargo containers 24 as they are loaded into the cargo compartment through access door opening 16, and also provides for rolling movement of the containers 24 as they are moved toward the aft portion of the cargo compartment. Movement of the containers 24 along the length of the cargo compartment 22 is facilitated by a plurality of rollers 44 recessed into the cargo floor. The rollers 44 rotate in place to allow the containers 24 to be easily moved within the cargo compartment and toward the ramp 18 for unloading. Ramp 18 may also have rollers 44 recessed into the surface thereof. A number of bumper restraints 48 are provided at the forward end of the cargo compartment to prevent the containers from colliding into the end wall of the cargo compartment. In addition, container restraint/locking mechanisms 46 are provided within the cargo floor which may be withdrawn from their recess spaces to engage the bottom or sides of the containers to keep the containers securely in place while the aircraft is in motion.

A container weighing mechanism or scale 52 is provided in the floor of cargo compartment 22 at the forward section thereof, for automatically weighing each container 24 as it is loaded into the cargo compartment area. In a preferred embodiment, the scale 52 is an electronic scale which automatically transmits the weight of each container to an on-board data storage device where it is correlated with the container-identifying information read by the bar code readers 50. Such electronic scales are known in the art and are commercially available. One example of such a scale is the Load Ranger, manufactured by Measurement Systems International, Seattle, Washington. However, any other equivalent commercially available weighing device may be used in this embodiment to achieve the same result.

In operation, containers 24 are sequentially presented at the cargo access door opening 16, through the use of any conventionally known cargo lifting system, where they are passed therethrough and loaded into the fore portion of the cargo compartment 22. The thus loaded containers 24 are then moved by the handling system 42, 44 toward the rear or aft portion of compartment 22.

At the destination point, the load bearing access ramp 18 is opened to provide a ramp extending to the ground, to a cargo vehicle, or to a fixed terminal cargo transporting system, and the containers 24 are then sequentially downloaded over the surface of the ramp 24 with the aid of the handling system rollers 44 and the force of gravity.

To improve the efficiency of cargo container management, each container may be provided with bar code identification labels. A plurality of bar code readers 50 may then be provided at the container ingress and egress points of the compartment 22, for example, adjacent the access door opening 16 and the end of the ramp 18, to automatically read the identifying information on the bar code to thus automatically keep track of the identity of each container that is loaded and unloaded from the compartment 18. The bar code readers 50 may transmit this data to an on-board data storage device which in turn may download the data to a management center processing system for processing.

Figure 5:
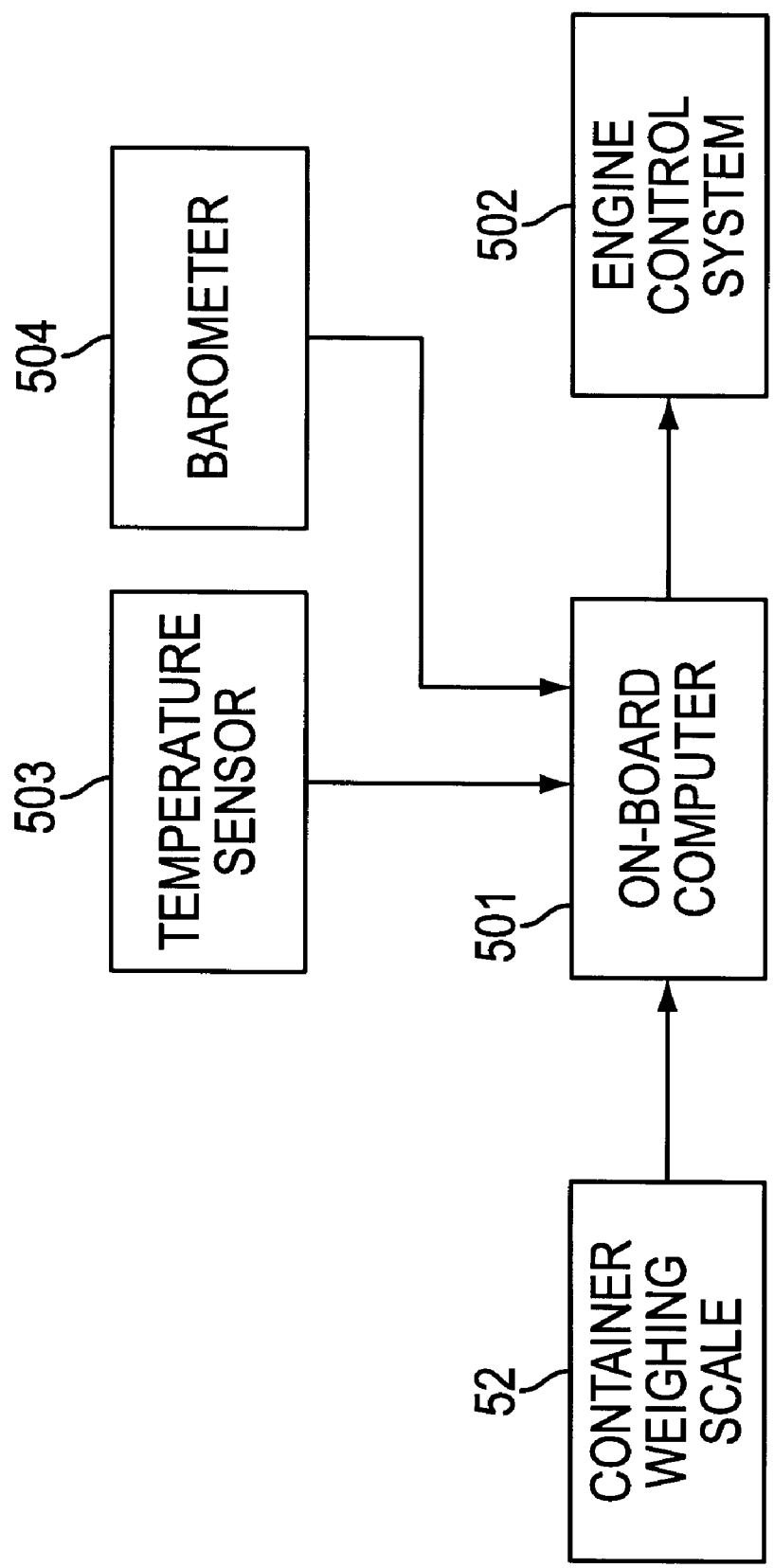
FIG. 5 is a block diagram of an automatic flat rate setting system according to one preferred embodiment of the invention.

A flat rate setting system is shown in FIG. 5. The system includes an on-board computer 501 in communication with the cargo container weighing scale 52, a temperature sensor 503, a barometer 504, and an engine control system 502. The flat rate setting system automatically resets the flat rate setting of the engines of the aircraft according to the actual gross weight of the aircraft prior to takeoff, and in conjunction with other relevant parameters such as the air temperature and atmospheric pressure as measured by the temperature sensor 503 and barometer 504. This information is used to set the flat rate of the engines to the required SHP (standard horsepower) as predetermined in advance for a number of various weights and parametric values.

For example, if the fully loaded aircraft prior to take-off has a gross weight of 40,000 lbs., 3000 SHP would be required for each of its two engines, at normal ambient temperature and barometric readings. Accordingly, the flat rate setting system would set the flat rate of the engines to 3000 SHP prior to take-off by inputting this information to the engine control system 502. The engine control system will then control the engines to have a maximum of 3000 SHP prior to take-off. The engine control is carried out by adjusting the operating parameters of the engines, such as fuel ratios, thrust, etc. in a manner that is well known to those skilled in the art and thus will not be explained further herein.

On the next flight, if the aircraft has unloaded cargo and now has an operational gross weight of only 30,000 lbs., the flat rate setting system detects this fact and determines that the engines require only 2500 SHP per engine. Accordingly, prior to take-off the flat rate setting system resets the flat rate to 2500 SHP per engine by sending a command signal to the engine control system 502.

Figure 6:
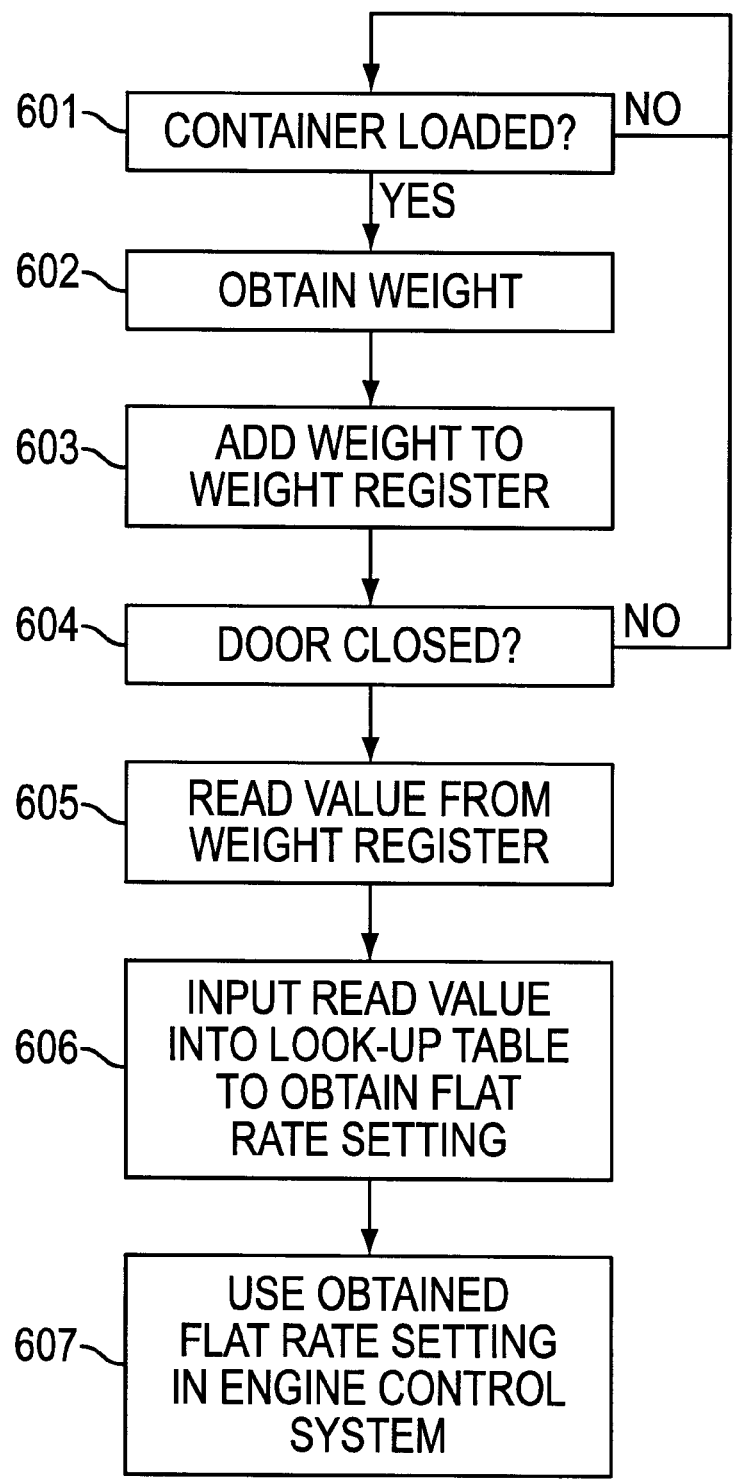
FIG. 6 is a flow diagram of a method of automatically setting the flat rate of the engines of an aircraft according to one preferred embodiment of the invention.

FIG. 6 shows a flow diagram 600 according to one embodiment of the invention. At step 601 it is determined whether a cargo container has been loaded onto the aircraft. As shown in FIG. 4 this can be determined by detecting a bar code read by bar code scanners 50. If it is determined that a container has been loaded, at step 602 the weight of the container is obtained. As shown in FIG. 4 this can be accomplished by reading the weight from the scale 52 mounted in the floor of the cargo compartment. If a container has not been loaded, the routine remains in a ready state as shown by the arrow cycling back to the beginning of the routine at step 601.

At step 603, the weight of the loaded container obtained from the scale 52 is added to a storage register in the on-board computer system used to accumulate the weight of the loaded cargo. At step 604, it is determined whether the cargo door has been closed, as an indication that loading of cargo has been completed. This step can be carried out through the use of a door sensor mounted in the doorway of the cargo access door, and coupled to the on-board computer. If the door has not been closed, the routine cycles back to await the loading of an additional cargo container, and steps 601–604 are repeated, until the system detects that the door has been closed, indicating that loading of cargo into the aircraft has been completed. At this time, the value from the weight storage register is read out of the register, thus providing the total gross weight of the loaded cargo.

This value is inputted into an appropriate look-up table at step 606, which look-up table stores required engine SHP values as a function of total gross weight, as well as air temperature and pressure. For example, the look-up table (not shown) could store SHP values for specific combinations of total gross weight, temperature and atmospheric pressure, or separate look-up tables could be provided for given temperature and atmospheric pressures, which store only engine SHP values as a function of total gross weight. Additionally, it will be noted that the empty weight of the aircraft is a known value that can be taken into account prior to storing the engine SHP values against total gross weight of the loaded cargo; consequently, the empty weight of the aircraft does not have to be added to the total weight stored in the weight register in order to look up the required engine flat rate settings.

At step 607, the obtained flat rate setting is inputted as a command signal to the engine control system and is used by the engine control system to set the SHP of the aircraft's engines.

The flat rate and engine operation information is displayed to the pilot on the engine instrument panel and serves as a guide to the necessary settings to maintain the adjusted flat rate while in flight. Should the pilot require the use of any remaining engine power for emergency operations, the displayed information can be ignored and the pilot may use as much engine power as is necessary under the specific conditions and circumstances encountered during flight.

The engine flat rate setting system and method of the present invention thus addresses an important and heretofore unfulfilled need in the transportation of commercial and military containerized freight. By automatically resetting the flat rate of the engines before each flight, a substantial savings in fuel is realized because the engine will operate at only its maximum required power for each given flight. As consequential benefits, significant reductions in engine wear and tear are realized, resulting in reduced maintenance functions and longer engine life.

The invention having been thus described, it will be obvious to those skilled in the art that the same may be varied in many ways without departing from the spirit and scope of the invention. Any and all such modifications are intended to be included within the scope of the following claims. For example, while in the disclosed embodiment the cargo loading, weight determination and completion of cargo loading have been described with reference to an automated system, it is possible for personnel to manually input the weight values as read from a scale and to input signals indicating that loading of cargo has been completed.

What is claimed is:

1. A method of setting a flat rate engine power setting of an aircraft, comprising the steps of:
    determining the total gross weight of the aircraft prior to take-off;
    determining, from the total gross weight, the required flat rate engine power for the aircraft; and
    automatically setting the flat rate setting of the aircraft's engines to correspond to the determined required engine power, prior to take-off.

2. The method of claim 1, wherein the step of determining total gross weight comprises the step of automatically detecting the loading of cargo containers into said aircraft, determining the weight of a loaded cargo container, adding the determined weight to a memory storage register, detecting the completion of cargo loading, and reading out the stored value from the memory storage register.

3. The method of claim 1, wherein the step of determining the required flat rate engine power comprises the step of inputting the determined total gross weight into a look-up table to retrieve from said look-up table required flat rate engine setting.

4. The method of claim 3, wherein said look-up table stores required flat rate engine settings as a function of air temperature in addition to total gross weight, the method further including the step of determining air temperature and inputting the air temperature as well as the total gross weight into the look-up table to obtain the required flat rate engine setting.

5. The method of claim 3, wherein said look-up table stores required flat rate engine settings as a function of atmospheric pressure in addition to total gross weight, the method further including the step of determining atmospheric pressure and inputting the atmospheric pressure as well as the total gross weight into the look-up table to obtain the required flat rate engine setting.

6. The method of claim 3, wherein said look-up table stores required flat rate engine settings as a function of air temperature and atmospheric pressure in addition to total gross weight, the method further including the steps of determining air temperature and atmospheric pressure and inputting the air temperature and atmospheric pressure as well as the total gross weight into the look-up table to obtain the required flat rate engine setting.

7. A method of automatically setting a flat rate engine power setting of an aircraft, comprising the steps of:
    determining when a cargo container has been loaded onto the aircraft;
    determining the weight of the loaded cargo container and adding the determined weight to a weight storage register;
    determining the total gross weight of the aircraft prior to take-off by reading out a stored value from said weight storage register;
    determining, from the total gross weight, the required flat rate engine power for the aircraft by inputting said stored value into a look-up table; and
    automatically setting the flat rate setting of the aircraft's engines to correspond to the determined required engine power, prior to take-off, by sending the obtained required flat rate engine power as a command signal to an engine control system.

8. The method of claim 7, wherein said look-up table stores required flat rate engine settings as a function of air temperature in addition to total gross weight, the method further including the step of determining air temperature and inputting the air temperature as well as the total gross weight into the look-up table to obtain the required flat rate engine setting.

9. The method of claim 7, wherein said look-up table stores required flat rate engine settings as a function of atmospheric pressure in addition to total gross weight, the method further including the step of determining atmospheric pressure and inputting the atmospheric pressure as well as the total gross weight into the look-up table to obtain the required flat rate engine setting.

10. The method of claim 7, wherein said look-up table stores required flat rate engine settings as a function of air temperature and atmospheric pressure in addition to total gross weight, the method further including the steps of determining air temperature and and atmospheric pressure and inputting the air temperature and atmospheric pressure as well as the total gross weight into the look-up table to obtain the required flat rate engine setting.

11. A system for automatically setting a flat rate engine power setting of an aircraft, comprising:
an on-board computer system, including
means for determining when a cargo container has been loaded onto the aircraft;
means for determining the weight of the loaded cargo container and adding the determined weight to a weight storage register;
means for determining the total gross weight of the aircraft prior to take-off by reading out a stored value from said weight storage register;
a look-up table for storing required flat rate engine power as a function of total gross weight of said aircraft;
means for determining, from the total gross weight, the required flat rate engine power for the aircraft by inputting said stored value into said look-up table; and
means for automatically setting the flat rate setting of the aircraft's engines to correspond to the determined required engine power, prior to take-off, by sending the obtained required flat rate engine power as a command signal to an engine control system.

12. The system of claim 11, wherein said means for determining when a cargo container has been loaded onto the aircraft comprises a bar code sensor for reading a bar code on a cargo container.

13. The system of claim 11, wherein said means for determining the weight of the loaded cargo container comprises an electronic scale mounted in the floor of a cargo compartment of said aircraft for automatically weighing a loaded cargo container and transmitting the weight in the form of a signal to the computer of the on-board computer system.

* * * * *